(12) United States Patent
Lee et al.

(10) Patent No.: US 8,070,873 B2
(45) Date of Patent: Dec. 6, 2011

(54) MEDIUM TEMPERATURE COATING MATERIAL FOR HIGH SPEED TURBOMACHINERY AND METHOD OF COATING SAME

(75) Inventors: Yong Bok Lee, Seoul (KR); Chang Ho Kim, Seoul (KR); Dong Jin Park, Seoul (KR); Jun Hyeon Jo, Daegu (KR)

(73) Assignee: Korea Institute of Science and Technology, Seoul (KR)

( * ) Notice: Subject to any disclaimer, the term of this patent is extended or adjusted under 35 U.S.C. 154(b) by 1049 days.

(21) Appl. No.: 11/893,677

(22) Filed: Aug. 16, 2007

(65) Prior Publication Data
US 2008/0057223 A1 Mar. 6, 2008

(30) Foreign Application Priority Data
Aug. 29, 2006 (KR) .................. 10-2006-0082461

(51) Int. Cl.
*H01L 21/316* (2006.01)
(52) U.S. Cl. .................... 106/287.18; 427/201; 427/576
(58) Field of Classification Search ............. 106/287.18
See application file for complete search history.

(56) References Cited

U.S. PATENT DOCUMENTS

| | | | | |
|---|---|---|---|---|
| 5,962,551 | A * | 10/1999 | Kobayashi et al. | 523/153 |
| 5,977,004 | A * | 11/1999 | Higashi et al. | 501/135 |
| 6,770,381 | B2 | 8/2004 | Kanayama et al. | |
| 6,887,585 | B2 | 5/2005 | Herbst-Dederichs | |
| 2002/0114980 | A1 * | 8/2002 | Gunsel et al. | 428/695 |
| 2004/0062709 | A1 * | 4/2004 | Higashi et al. | 423/594.17 |
| 2006/0243441 | A1 * | 11/2006 | Cornelius de Grood et al. | 166/280.2 |
| 2007/0003693 | A1 * | 1/2007 | Lee et al. | 427/180 |
| 2007/0272231 | A1 * | 11/2007 | Ambrose | 126/337 R |

FOREIGN PATENT DOCUMENTS

| | | | |
|---|---|---|---|
| EP | 834469 A1 * | 4/1998 | |
| EP | 856489 A1 * | 8/1998 | |
| JP | 01-149950 | 6/1989 | |
| KR | 10-2005-0065939 | 6/2005 | |

OTHER PUBLICATIONS

PCT/KR2006/005286 Written Opinion of the International Searching Authority and International Search Report, May 11, 2007, Korea Institute of Science and Technology et al.

* cited by examiner

*Primary Examiner* — Jerry A Lorengo
*Assistant Examiner* — Ross J Christie
(74) *Attorney, Agent, or Firm* — NSIP Law

(57) ABSTRACT

Embodiments of the present invention may provide a coating material having heat resistance, abrasion resistance and low friction characteristics, which is coated on an operating component such as a rotating shaft working at a high speed without oil supply in a medium temperature environment (400° C.~500° C.). This is so that the operating body can sufficiently withstand friction, heat generation and abrasion caused by contact with a bearing. The coating material of the present invention comprises 15 to 25 wt % antimony trioxide ($Sb_2O_3$), 50 to 70 wt % binder, 10 to 20 wt % tungsten disulphide ($WS_2$) and 5 to 15 wt % silver (Ag). The binder comprises 60 to 80 wt % nickel (Ni) and 20 to 40 wt % chromium (Cr).

4 Claims, 10 Drawing Sheets

MEDIUM TEMPERATURE COATING MATERIAL FOR HIGH SPEED TURBOMACHINERY AND METHOD OF COATING SAME

The present application claims priority from Korean Patent Application No. 10-2006-0082461 filed on Aug. 29, 2006, the entire subject matter of which is incorporated herein by reference.

BACKGROUND

1. Field

The present invention generally relates to coating materials, and more particularly to a coating material having low friction characteristics and heat and abrasion resistance, which is coated on a component (e.g., rotating shaft) adapted to operate in a medium temperature environment (400 to 500° C.) so as to minimize any friction and abrasion between such component and a bearing supporting the same. The present invention is further directed to a method of coating said coating material.

2. Background

Air bearings, which use hydrodynamic properties of air, are generally used to support a rotating shaft in a high-speed rotating apparatus. An example of such type of apparatus includes an air cycle machine (an essential part of an air conditioning system for aircrafts), a gas turbine, a turbocharger, an auxiliary power device or the like. An air foil journal bearing is one example of such air bearings. The air foil journal bearing includes a bump foil and has inherent stiffness and damping property according to the shape of the bump foil.

FIG. 1 is a sectional view illustrating an assembled structure of a rotating shaft and an air foil journal bearing of prior art.

As shown in FIG. 1, the air foil journal bearing 1 includes: a housing 2; a shim foil 4 provided along the inner peripheral surface of the housing 2; a bump foil 6 located on the shim foil 4; and a top foil 8 provided on the bump foil 6 and being subjected to a load acting vertically with respect to the axial direction of the rotating shaft 9. The existing air blowers or compressors, which are operated at high speeds, are deficient in that cooling systems must be equipped thereto since the rotating shaft and the bearing are prone to damage due to a rapid temperature rise caused by a rubbing phenomenon. As one of the approaches for dealing with such a problem, the foils 4, 6 and 8 are typically made from the INCONEL material in order to enhance the durability and operation reliability at high temperatures. Particularly, the surface of the top foil 8, which is in direct contact with the rotating shaft 9, is coated with a hybrid type solid lubricant. Alternatively, a sol-gel coating or a coating material including molybdenum oxide ($MoS_2$) may be applied to the top foil 8. Further, the abrasion resistance and lubrication may be enhanced by coating a coating material 9' containing chromium oxide ($Cr_3O_2$) (e.g., "CORONA 910/920" disclosed in U.S. Patent Application Publication No. US2007/0003693A1 (Lee et al.)) on the surface of the rotating shaft 9 by plasma spraying.

The above-mentioned prior art coating materials have a low limited life for abrasion since they are applied thin on the surface of the top foil. The CORONA 910/920, which is coated on the rotating shaft, exhibits its ability only at a high temperature of greater than 750° C. Those materials cannot guarantee a good lubricating ability when applied to a turbomachinery such as a turbocharger, which is operated at a medium temperature of 400 to 500° C.

Accordingly, there is a need in the art to develop a coating material capable of withstanding friction, heat and abrasion, which occur due to contacting the bearing, when the rotating shaft is rotated at a high-speed without any oil supply in a medium temperature environment of 400 to 500° C. (particularly when the rotating shaft starts or stops). There is a further need in the art to develop a coating method that allows the durability of the coating material to be retained for a long time.

BRIEF DESCRIPTION OF THE DRAWINGS

Arrangements and embodiments may be described in detail with reference to the following drawings in which like reference numerals refer to like elements and wherein.

DETAILED DESCRIPTION OF THE PRESENT INVENTION

A detailed description may be provided with reference to the accompanying drawings. One of ordinary skill in the art may realize that the following description is illustrative only and is not in any way limiting. Other embodiments of the present invention may readily suggest themselves to such skilled persons having the benefit of this disclosure.

Figure 1:
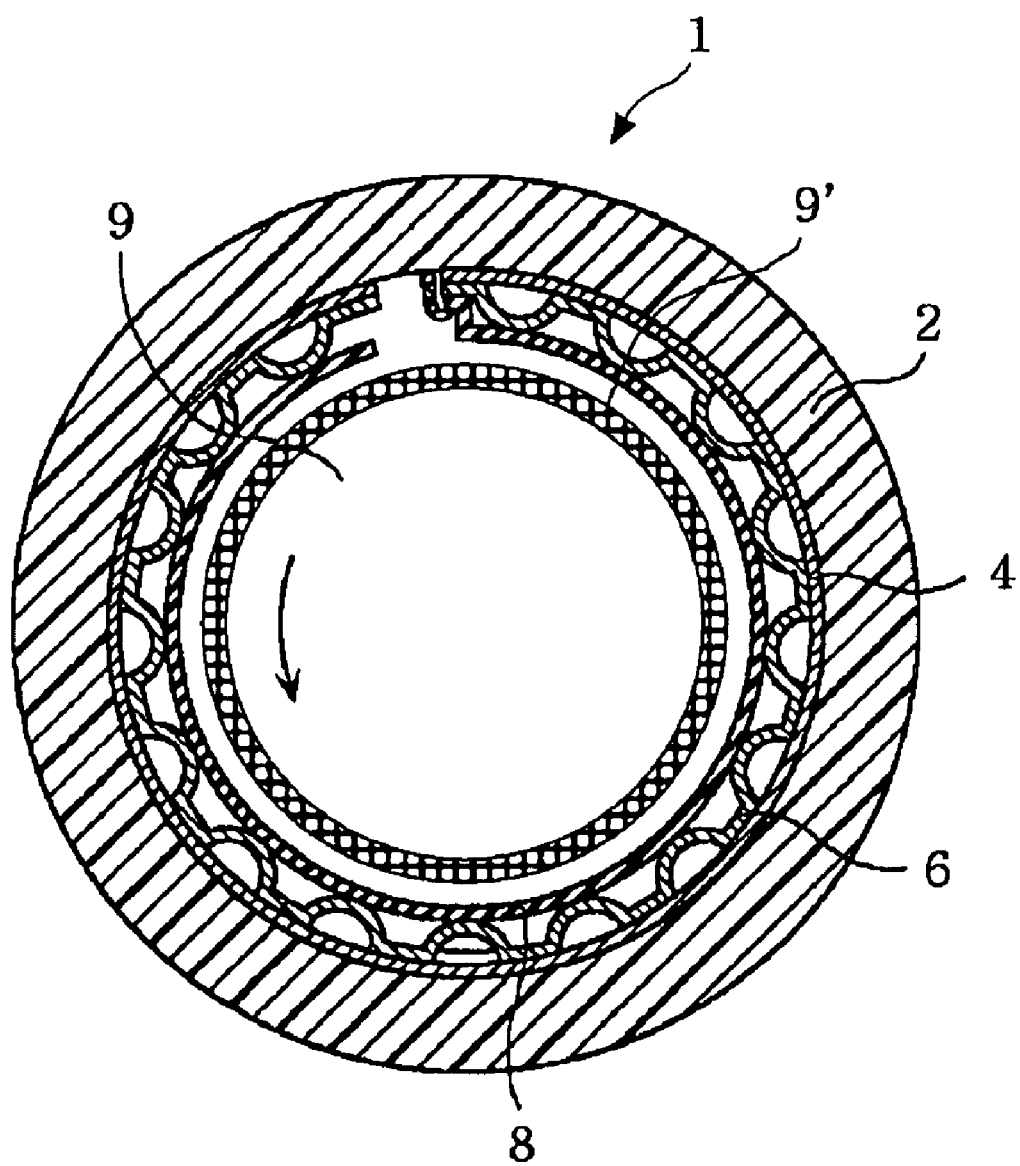
FIG. 1 is a sectional view illustrating an assembled structure of a rotating shaft and an air foil journal bearing according to the prior art.
Figure 2:
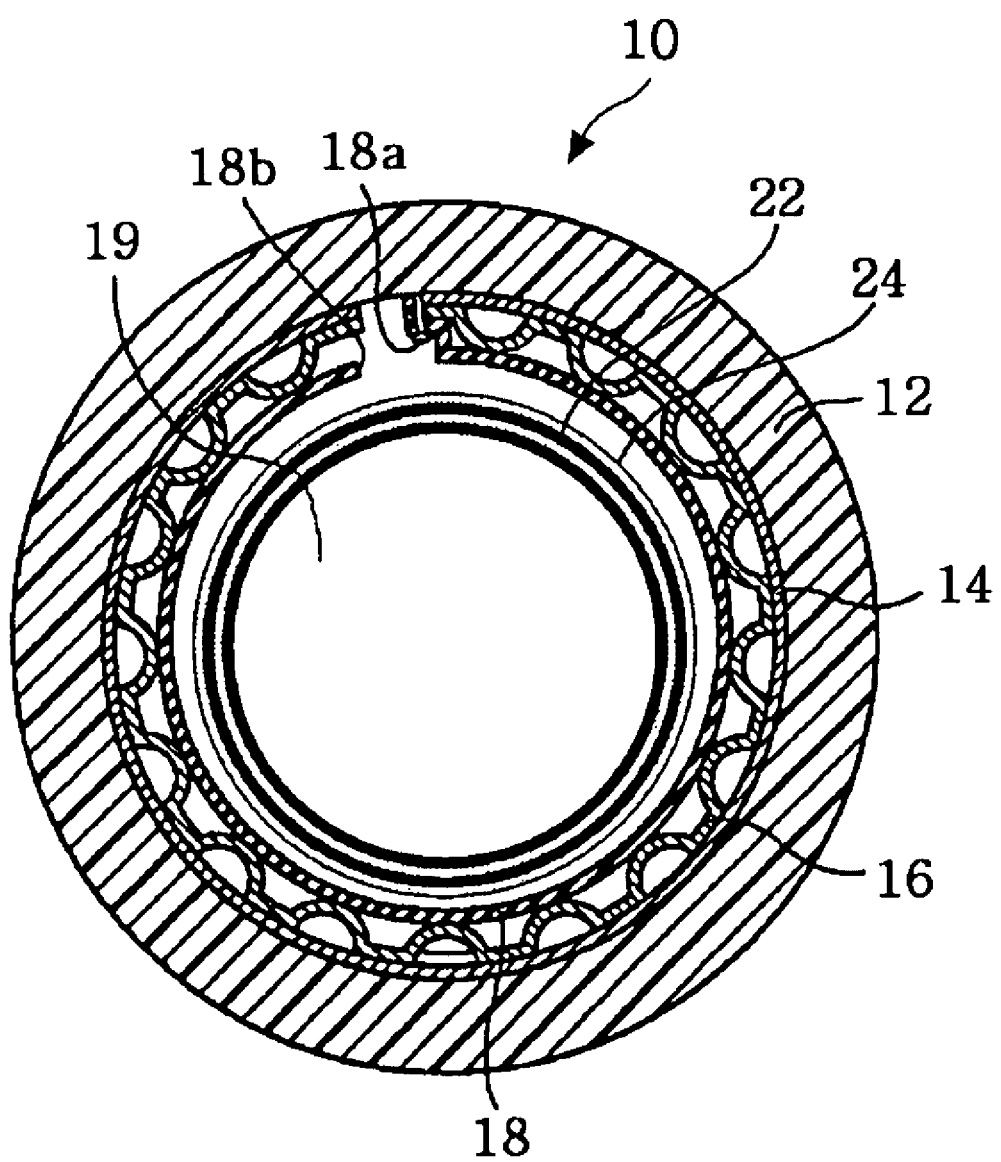
FIG. 2 is a sectional view illustrating an assembled structure of a rotating shaft (on which a coating material of the present invention is coated) and an air foil journal bearing.

FIG. 2 is a sectional view showing an assembled structure of a rotating shaft (on which a coating material of the present invention is coated) and an air foil journal bearing.

As shown in FIG. 2, the air foil journal bearing 10 surrounds and supports a rotating shaft 19. The air foil journal bearing 10 comprises the following: a housing 12; a shim foil 14 provided along the inner peripheral surface of the housing 12; a bump foil 16 located on the shim foil 14; and a top foil 18 provided on the bump foil 16 and being subjected to a load acting vertically with respect to the axial direction of the rotating shaft 19. The top foil 18 includes a fixed end 18a fixed to an inner surface of the housing 12 and a free end 18b extending over the bump foil 16. In order to enhance the durability and operation reliability at high temperatures, the foils 14, 16 and 18 are made from the INCONEL material (more specifically INCONEL X-750). Particularly, a surface of the top foil 18, which is in direct contact with the rotating shaft 19, is coated with a hybrid type solid lubricant having heat resistance, abrasion resistance and low friction characteristics. The solid lubricant serves to form a thin solid adhesive layer on two sliding surfaces, thereby reducing the friction and abrasion therebetween. It is also required to have characteristics such as heat resistance and durability. The solid lubricant, which is widely used for industrial uses, includes graphite having a stratified or lamella structure, molybdenum disulphide ($MoS_2$), tungsten disulphide ($WS_2$), a high molecular fluorine resin material (PTFE) and the like.

The coating material of the present invention is coated on the surface of the rotating shaft 19 to reduce friction, which occurs between the rotating shaft 19 and the top foil 18 during the rotation of the rotating shaft 19 (particularly during initial starting and stopping thereof).

Components and component ratios of the coating material of the present invention are shown in Table 1 below.

TABLE 1

| | Component (wt %) | | | | |
| --- | --- | --- | --- | --- | --- |
| | $Sb_2O_3$ | NiCr | $WS_2$ | Ag | $MoO_3$ |
| CORONA 510 | 15~25 | 50~70 | 10~20 | 5~15 | . |
| CORONA 520 | 15~25 | 40~65 | 10~20 | 5~15 | 5~15 |

The coating material of the present invention, which is named "CORONA 510" by the present applicants, comprises 15 to 25 wt % antimony trioxide ($Sb_2O_3$), 50 to 70 wt % nickel-chromium (NiCr), 10 to 20 wt % tungsten disulphide ($WS_2$) and 5 to 15 wt % silver (Ag). Also, another coating material of the present invention, which is named "CORONA 520" by the present applicants, comprises 15 to 25 wt % antimony trioxide ($Sb_2O_3$), 40 to 65 wt % nickel-chromium (NiCr), 10 to 20 wt % tungsten disulphide ($WS_2$), 5 to 15 wt % silver (Ag) and 5 to 15 wt % molybdenum oxide ($MoO_3$).

Antimony trioxide ($Sb_2O_3$) is a ceramic material having a structure similar to alumina and is one of the oxides with the greatest hardness. Antimony trioxide was typically used as a white pigment and has recently been used as a flame retardant for various resins, vinyl cables, paints, etc. Particularly, when used together with molybdenum oxide ($MoO_3$), it exhibits superior mechanical characteristics as well as heat and abrasion resistance. It is mainly used as a coating material of an operating component (on which sliding contact occurs). When the solid lubricant is used in high temperature environments, the creation of an oxidized film is one of the factors that greatly influence the lubricating ability. However, since antimony trioxide ($Sb_2O_3$) already retains an oxidized film form of $O_3$, the additionally created amount is lower than those of the other materials, wherein it can play the role of a lubricant more stably.

Figure 3:
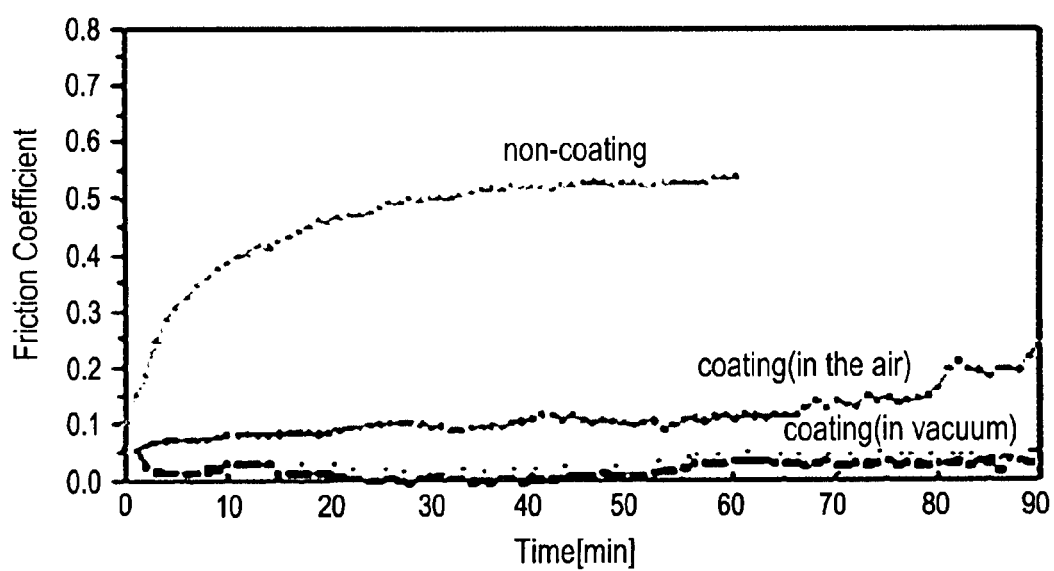
FIG. 3 is a graph showing frictional characteristics of tungsten disulphide ($WS_2$) contained in the coating material of the present invention.

Tungsten disulphide ($WS_2$) is a solid lubricant capable of being used from an ultra low temperature to a high temperature (i.e., −273° C. to 1200° C.). Particularly, when used in a high temperature environment, it forms a thin coating layer on a boundary surface where the friction occurs, thereby enhancing the lubricating ability and abrasion resistance. It has superior lubricating ability, corrosion resistance and chemical resistance characteristics compared to graphite, molybdenum disulphide ($MoS_2$) and the like. It also has a friction coefficient of not more than about 0.1 when used in the air (see FIG. 3). Further, tungsten disulphide ($WS_2$) is known to be capable of being mixed with grease, oil or the like and can be applied to most materials such as metal, ceramics, plastic and the like. Its usable temperature range is −273° C. to 1200° C. Such temperature range is broader than that of a barium fluoride/calcium fluoride (i.e., 350° C. to 900° C.), which is typically used as a solid lubricant for high temperatures.

Molybdenum oxide ($MoO_3$) is known as a material, which has one of the strongest binding structures among the solid lubricants of ceramic series. It is typically used as a wetting agent. It is also known to remarkably decrease the surface tension and facilitate the crystallization of powders. The usable temperature range of molybdenum oxide ($MoO_3$) is 300° C. to 1000° C. Its measured friction coefficients show a distribution of 0.16 to 0.25. Molybdenum oxide ($MoO_3$) does not show an especially good lubricating ability at the room temperature (25° C.). However, it shows a good lubricating ability at a high temperature of greater than 300° C. (particularly at greater than 700° C.).

The coating material of the present invention further comprises silver (Ag), which is one of the solid lubricants capable of withstanding a high temperature of up to about 1000° C. Silver (Ag) is a solid lubricant that can be used from the room temperature (25° C.) to high temperature (1000° C.). Further, it has a friction coefficient ranging from about 0.09 to about 0.3.

Further, the coating material of the present invention comprises nickel-chromium (nichrome) as a binder for increasing the binding forces of the above-described components. The binder comprises 60 to 80 wt % nickel (Ni) and 20 to 40 wt % chromium (Cr). The binder may further comprise greater than 0 to 10 wt % aluminum (Al) based on the gross weight of the nickel and chromium. Preferably, in this embodiment, the binder composed of 76 wt % nickel, 18 wt % chromium and 6 wt % aluminum is utilized. However, it should not be limited to such a component ratio. Among the materials used for plasma spraying, nickel-chromium (NiCr) has a superior self-binding property and a fairly strong resistance against oxidation and corrosion in the high temperature environment. If applied to an air foil bearing, the coating material must have a binding force that can withstand the pressure of about 30 $MN/m^2$, which is a value of pressure occurring inside the bearing. In order to retain such a binding force, there is a need to use a material for increasing the binding force. Nickel-chromium is capable of withstanding a pressure of not less than 35 $MN/m^2$ and is thus suitable for the above-mentioned purpose. Also, in order to increase a low friction effect, a certain solid lubricant effective at a high temperature needs to be added thereto. In such a case, gold (Au), platinum (Pt), palladium (Pd), silver (Ag) or the like is a typical solid lubricant, which is suitable for such use.

Table 2 shows the particle size of each component used for manufacturing the coating material (i.e., CORONA 510, CORONA 520) of the present invention.

TABLE 2

| | Particle size of component (μm) | | | | |
| --- | --- | --- | --- | --- | --- |
| | $Sb_2O_3$ | NiCr | $WS_2$ | Ag | $MoO_3$ |
| CORONA 510/520 | 0.4~0.6 | 45~120 | 12 | 3~5 | 1.7 |

As shown in Table 2, the particle sizes of all the components (i.e., $Sb_2O_3$, NiCr, $WS_2$, Ag, $MoO_3$) fall in the range of 0.4 to 120 μm. Such range of the particle sizes is suitable to perform plasma spray coating after spray drying process.

The spray drying and the plasma spray coating will now be described.

The above-described components, which are in accordance with the component ratio and particle size shown in Tables 1 and 2, are sufficiently pulverized using a ball milling process. The powder from the pulverized component is then dried using a rotary spray dryer. The ball milling process or the rotary spray dryer are known in the art. Thus, their descriptions are omitted herein. Of course, such pulverizing and drying are not limited to the ball milling process and the spray drying process.

Figure 4:
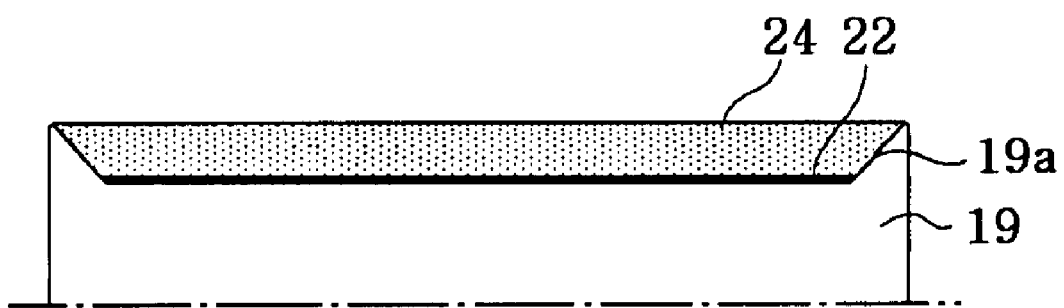
FIG. 4 is a sectional view showing a state where an abrasion-resistant layer, which uses the coating material of the present invention, is coated on the rotating shaft in the form of a single layer.

FIG. 4 is a sectional view showing a state where the coating material of the present invention is coated on the rotating shaft 19 in the form of a single layer.

The rotating shaft 19 is made from INCONEL series, which are suitable for high temperature environments (preferably INCONEL X-718). As shown in FIG. 4, an undercut portion 19a, which is 250 μm deep, is formed on the surface of the rotating shaft 19. On the undercut portion 19a, a binder layer 22 of nickel-chromium (30 to 50 μm thick) and an abrasion-resistant layer 24 using the coating material (CORONA 510/520) (200 to 220 μm thick) are coated one after the other. The nickel-chromium (NiCr) binder has a fairly strong resistance against oxidation and corrosion under a high temperature environment. It is used for increasing the binding force between two objects that are to be bound to each other, as discussed above. Preferably, in this embodiment, the nickel-chromium binder composed of 76 wt % nickel, 18 wt % chromium and 6 wt % aluminum is utilized. However, it should not be limited to such a component ratio. The powders for forming the nickel-chromium (NiCr) binder layer 22 are prepared by the above-mentioned ball milling process and spray drying process for nickel (Ni), chromium (Cr) and aluminum (Al).

The powders for forming the nickel-chromium (NiCr) binder layer 22 and the powders for forming the abrasion-resistant layer 24 (CORONA 510/520) are coated on the undercut portion 19a of the rotating shaft 19 one after the other by a plasma spray coating process. As is well known in the art, the plasma spray coating technology is a film forming technology, which uses an ultra high temperature and high speed plasma jet as a heat source by converting an inert gas such as argon (Ar), hydrogen ($H_2$), etc. into plasma with arc and ejecting the same from a nozzle. That is, if the powders for forming the films on the rotating shaft 19 are injected into a plasma flame, then a great quantity of heat and momentum are transferred from the plasma jet to the powders through interaction of the plasma and the powders. The powders, which are fused and accelerated by the plasma jet, are impinged onto the undercut portion 19a of the rotating shaft 19 or the nickel-chromium (NiCr) binder layer 22. They then form a film of 200 to 220 μm thick with a mechanical binding force caused by rapid cooling and solidification. It should be noted that the film formation may be performed by coating processes other than the plasma spray coating described above.

Table 3 shows the conditions for the plasma spraying coating, which the present applicants have discovered by conducting a number of experiments. Based on such experiments, the coating material of the present invention showed the most excellent performance.

TABLE 3

| Conditions of plasma spray coating | |
|---|---|
| Current (A) | 450~500 (480) |
| Voltage (V) | 40~80 (60) |
| Standoff (mm) | 90~110 (100) |
| Primary reaction gas | Ar |
| Flow rate of primary reaction gas (scfh) | 75~85 (80) |
| Secondary reaction gas | $H_2$ |
| Flow rate of secondary reaction gas (scfh) | 7~13 (10) |
| Powder feed rate (lbs/hr) | 2.5~3 (2.7) |
| Type of powder feed | External |

In Table 3, the values in parentheses correspond to the optimal values. The standoff means a distance from an ejection port of a nozzle in a plasma spray coating apparatus to the undercut portion 19a of the rotating shaft 19. The type of powder feed means that the powder is fed from an external toward the ejection port of a nozzle.

Since a surface formed by the plasma spray coating process is very rough, there is a need to reduce the difference in friction coefficients resulting from the difference in such surface roughness. To this end, after the plasma spray coating process, the grinding and polishing process using a diamond paste and a grinding wheel adjusts the surface roughness (preferably not more than 2 μm) of the coated layer.

Figure 5:
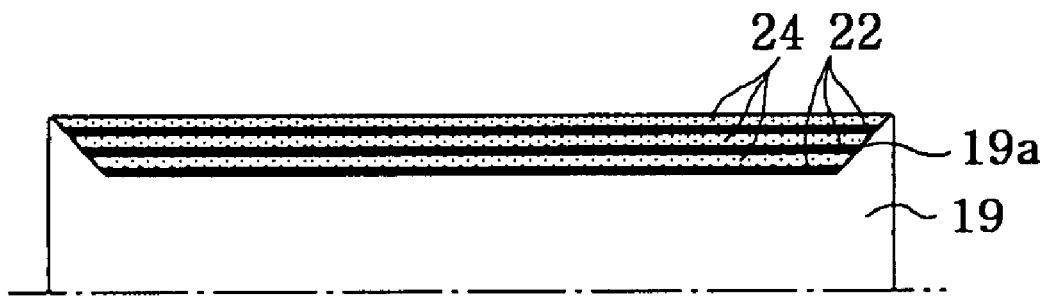
FIG. 5 is a sectional view showing a state where an abrasion-resistant layer, which uses the coating material of the present invention, is coated on the rotating shaft in the form of multiple layers.

FIG. 5 illustrates a state where an abrasion-resistant layer, which uses the coating material of the present invention, is coated on the rotating shaft 19 in the form of multiple layers.

As shown in FIG. 5, after the nickel-chromium (NiCr) binder layer 22 is bond-coated on the undercut portion 19a, which is formed to be 250 μm deep on the surface of the rotating shaft 19, by the plasma spray coating, the abrasion-resistant layer 24 is formed on the nickel-chromium (NiCr) binder layer 22 by using the coating material (CORONA 510/520) of the present invention through the plasma spray coating. At this time, the combination of the nickel-chromium (NiCr) binder layer 22 and the abrasion-resistant layer 24 is configured to be plural layers (more than two layers) by suitably adjusting the thickness of the abrasion-resistant layer 24. In this embodiment, the combination of the nickel-chromium (NiCr) binder layer 22 and the abrasion-resistant layer 24 is configured to be three layers. Further, the thicknesses of the nickel-chromium (NiCr) binder layer 22 and the abrasion-resistant layer 24 are 30 to 50 μm, respectively. If necessary, those can be changed in a number of ways. Such overlapped-layer coating method produces more excellent effects in terms of durability and retaining low friction compared to the above-described single-layer coating method (shown in FIG. 4), wherein the binding forces between the abrasion-resistant layer 24 and the rotating shaft 19 become more excellent. This is because since the nickel-chromium (NiCr) binder layer 22 of a single layer can typically withstand a pressure of 35 $MN/m^2$, the coating configuration of three layers may withstand the pressure of 105 $MN/m^2$, which is three times the amount of said pressure value. Thus, such coating configuration with overlapped layers, which has a high binding force, can sufficiently withstand the pressure occurring outside the rotating shaft when it is rotated under high temperature, high load and ultra high speed conditions.

Further, when considering that the thickness of 2.5 μm (equals to 10% of the total thickness (250 μm) of the nickel-chromium (NiCr) binder layer 22 and the abrasion-resistant layer 24) is an abrasion limit to the abrasion-resistant layer 24 of a rotating shaft rotating at about 30,000 cycles, the coating amount for the abrasion-resistant layer 24 having a minimum thickness of 30 μm may be appropriate.

Figure 6:
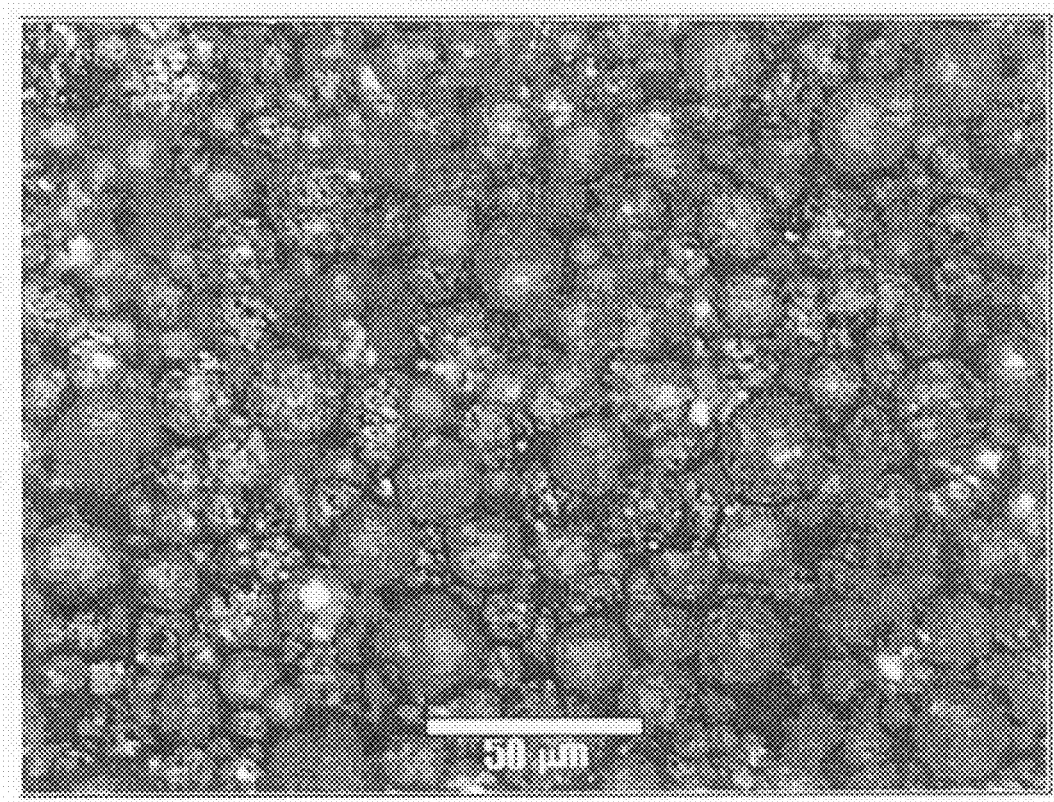
FIG. 6 is an enlarged picture taken with an electron microscope to show the coating material of the present invention.

FIG. 6 shows a picture of the powders in the final coating layer applied to CORONA 520. FIG. 6 shows that the particle sizes of the powders remain at 10 to 25 μm.

Figure 7:
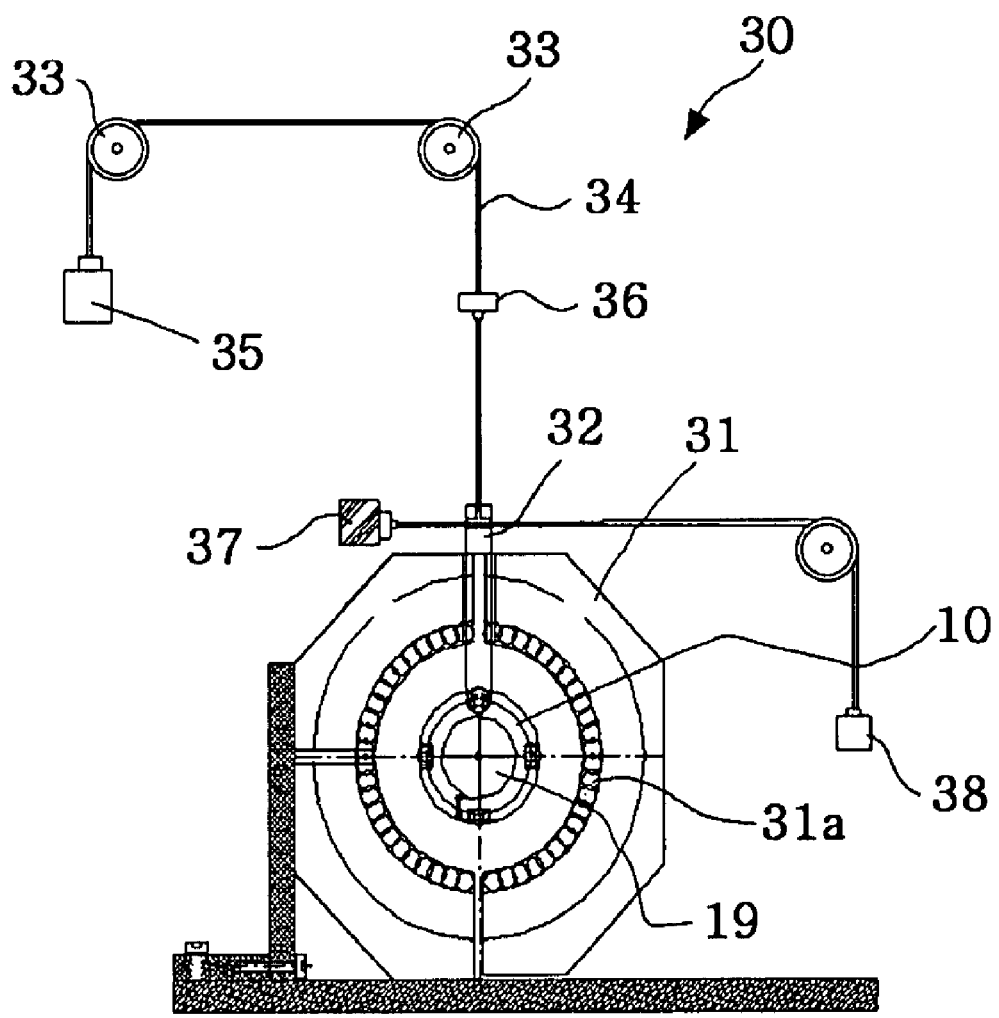
FIG. 7 is a schematic diagram showing a performance test apparatus for testing performances of the coating material of the present invention.

FIG. 7 is a schematic diagram showing a test apparatus for evaluating a friction coefficient performance for the rotating shaft with the coating material of the present invention coated thereon.

As shown in FIG. 7, the performance test apparatus 30 includes: a main body 31 for containing the rotating shaft 19 and an air foil bearing 10 for supporting the rotating shaft; means for applying a load to the housing 12 (see FIG. 2) of the air foil bearing 10; and a torque sensor 37 for measuring a torque during a rotation of the rotating shaft 19.

The main body 31 has heat generating means 31a capable of generating heat of up to about 1200° C. such that a temperature environment to be formed during a rotation of the rotating shaft in an actual high-speed rotating apparatus can be made. It also has drive means (not shown) (e.g., a BLDC motor) capable of rotating the rotating shaft 19 up to 50,000 rpm.

The load applying means includes a load bar 32, a rope 34 and a weight 35. One end of the load bar 32 is joined to an outer wall of radial upper end portion of the housing 12 of the air foil bearing 10. The other end of the load bar 32 vertically extends outwardly of the main body 31. The rope 34 is connected to the other end of the load bar 32 and is wound around one or more rollers 33. The weight 35 is connected to a tip portion of the rope 34 and applies a load (in this embodiment, about 10 kPa), which pulls the load bar 32 upwardly as shown in FIG. 7. The middle portion of the rope 34 is provided with a load sensor 36 for measuring a load, which is applied to the housing 12 of the bearing 10. Reference numeral 38 indicates a counterbalance for horizontally applying a predetermined load to the load bar 32 so that the load bar 32 can be positioned vertically before the operation of the performance test apparatus.

Figure 8:
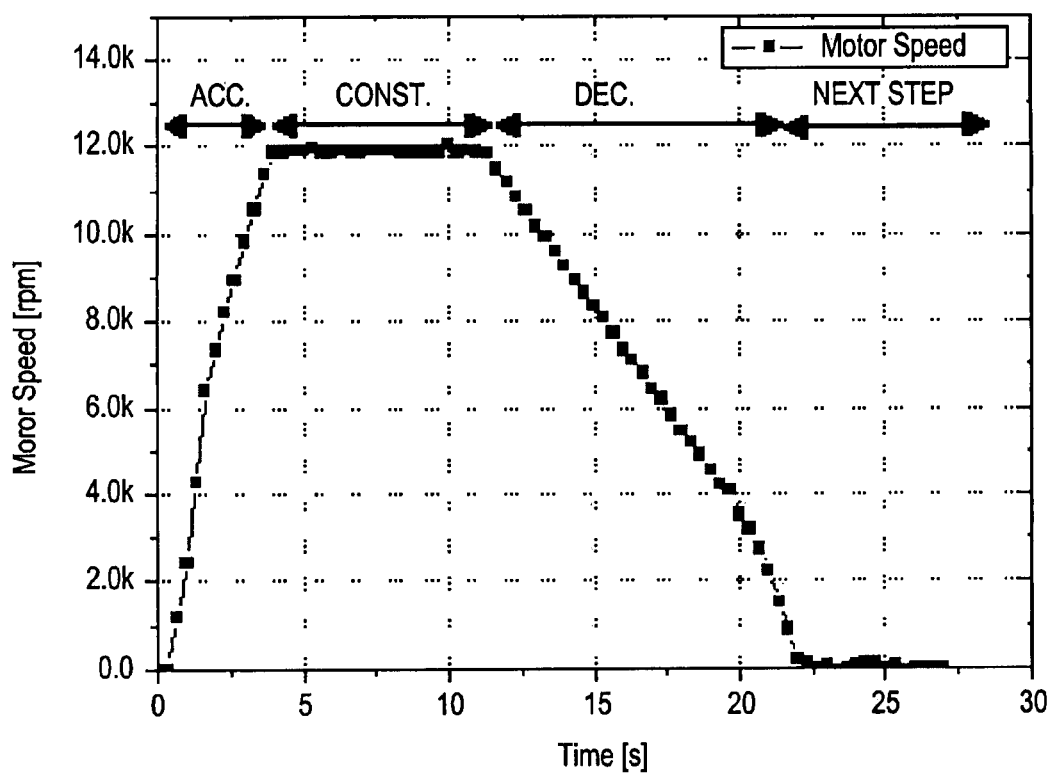
FIG. 8 is a graph showing a motor speed variance of the rotating shaft according to time during one cycle operation obtained by using the performance test apparatus shown in FIG. 7.

In a preparation state before the operation of the test apparatus, the housing of the air foil bearing 10 is pulled upwardly due to the weight 35 connected to the other end of the rope 34. Further, the radial lower end portion of the rotating shaft 19 is brought into contact with the top foil 18 (see FIG. 2) of the bearing. When rotating the rotating shaft 19, an external air flows between the rotating shaft 19 and the bearing 10. Then, the rotating shaft 19 floats up from the top foil 18 of the bearing 10. When stopping the rotation of the rotating shaft 19 after a predetermined time period, the radial lower end portion of the rotating shaft 19 returns so as to contact the top foil 18 of the bearing 10. The experiments, which utilized the rotating shaft 19 with CORONA 510 coating layers of the present invention coated thereon, were made in a medium temperature environment (400° C. to 500° C.). As shown in FIG. 8, one cycle is composed of an acceleration mode (ACC), a constant mode (CONST), a deceleration mode (DEC) and a waiting mode (NEXT STEP). The time for one cycle is set at 26 seconds and the motor speed in a constant mode is set at 12,000 rpm.

Figure 9:
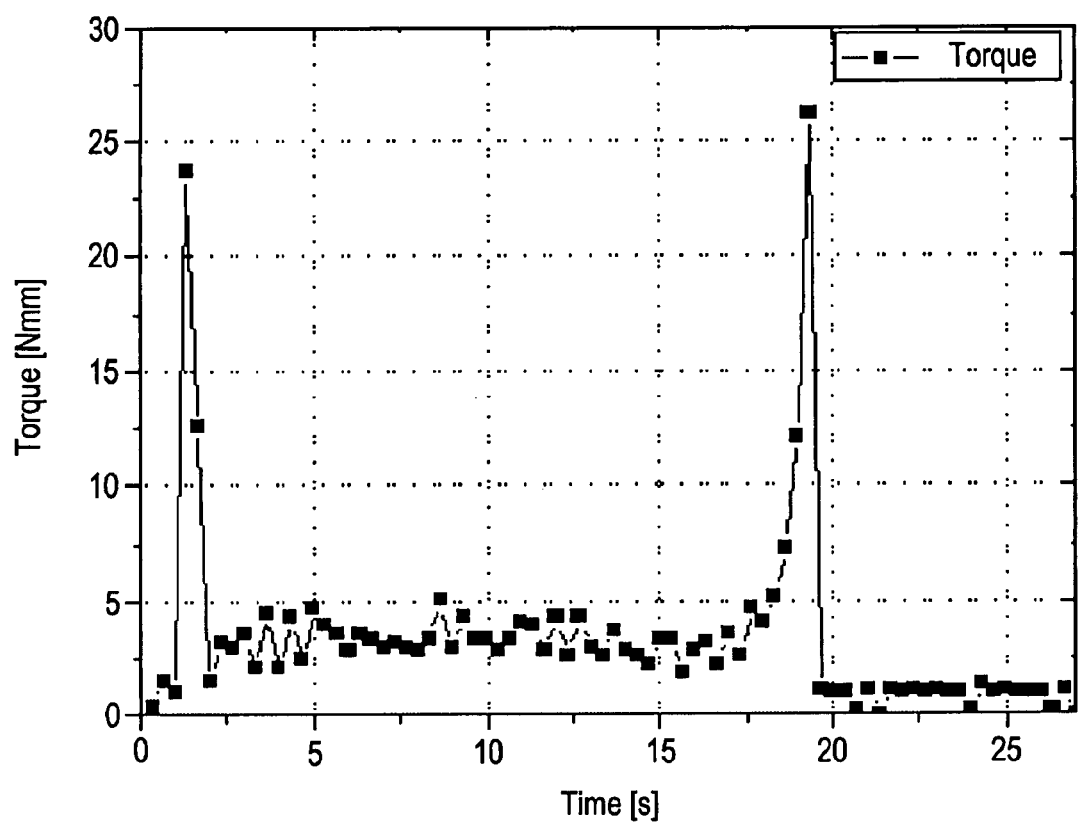
FIG. 9 is a graph showing a torque variance of the rotating shaft that occurs during one cycle operation obtained by using the performance test apparatus shown in FIG. 7.

FIG. 9 is a graph plotted by measuring the torque variances of the rotating shaft 19 occurring during one cycle in the performance test apparatus. From FIG. 9, it can be seen that a torque at the start of the rotating shaft 19 and a torque at the stop of the rotating shaft 19 are 24 Nmm and 26 Nmm, respectively.

Figure 10:
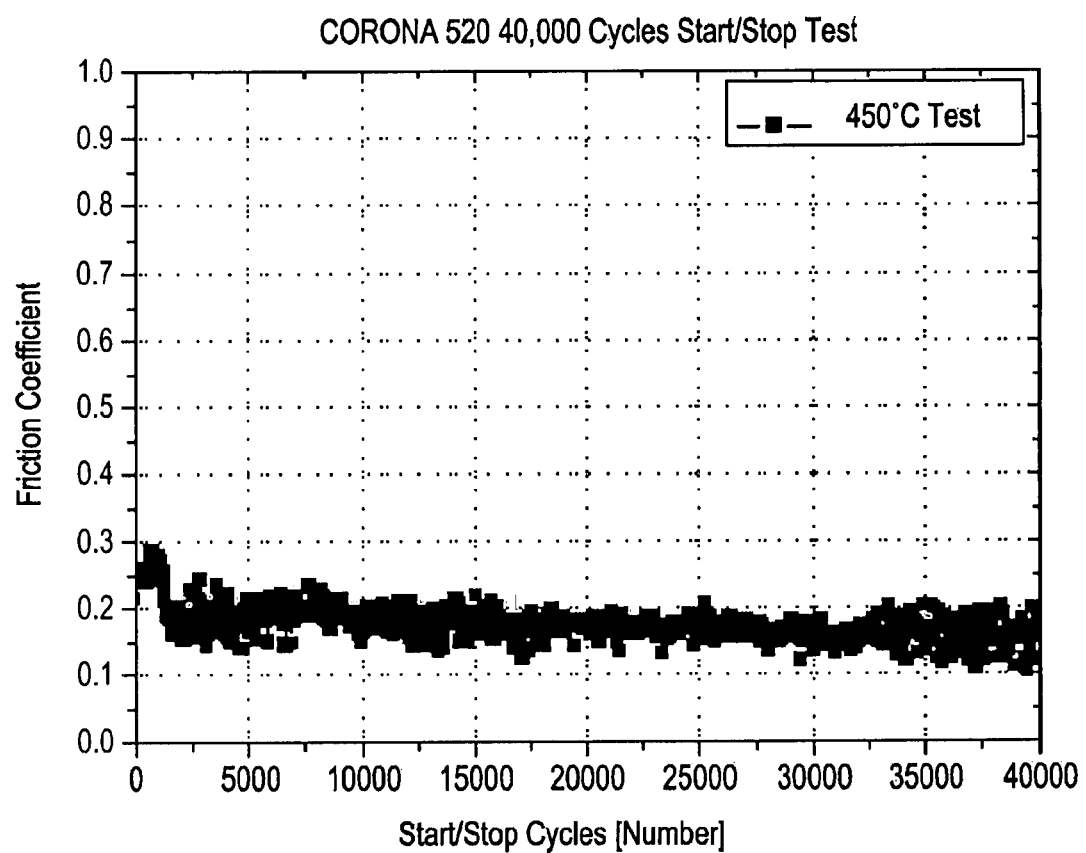
FIG. 10 is a graph showing friction coefficient values calculated during 40,000 cycles under a medium temperature condition of 450° C. by using the performance test apparatus shown in FIG. 7.

The friction coefficient (μ) at the start and stop of the rotating shaft 19 can be calculated from the load (N) measured by means of the load sensor 36 and the torque (T) measured by means of the torque sensor 37 (i.e., μ=T/N), as shown in FIG. 10. FIG. 10 is a graph showing the values of the friction coefficients, which were calculated during 40,000 start/stop cycles under a medium temperature environment (450° C.). The friction coefficient values are approximately 0.175 μm. Consequently, it can be seen that the coating material of the present invention rather shows more excellent effects in a medium temperature environment. Since the actual high-speed rotating apparatus is also generally started in the state where it is sufficiently pre-warmed by high temperature gases, the coating material of the present invention can show excellent effects when actually applied.

Table 4 shows a degree of abrasion and an expectance of a limited life of the rotating shaft (to which CORONA 510/520 are applied) as well as the air foil bearing after 40,000-cycle-operation using the performance test apparatus 30 under the above-st described test conditions.

TABLE 4

| Shaft | Foil | Temp. | Friction, μ | Test Cycles | Foil Wear | Shaft Wear | Limited Life |
|---|---|---|---|---|---|---|---|
| CORONA 510/520 | Bare | 450° C. | 0.175 ± 0.04 | 40,000 | 4 μm | 5 μm | 240,000 |

As shown in Table 4, in case of CORONA 510/520, wears of the top foil 18 of the bearing 10 and the rotating shaft 19 occur as 4 μm and 5 μm, respectively, after 40,000-cycle-operation. The limited life of up to about 240,000 cycles can be expected.

The coating material of the present invention, which has heat resistance, abrasion resistance and low friction characteristic, has been described by way of example wherein it is applied to the rotating shaft of the high-speed rotating apparatus. However, it should be noted that the inventive coating material can be applied to all elements of machinery, which are slidable as faced to each other like a sliding movement in addition to a rotation movement.

The inventive coating material has heat resistance, high abrasion resistance and superior low friction characteristic. Also, it is used not only in a high temperature environment but also in a medium temperature (400° C.~500° C.) environment. Thus, the operation reliability and durability of the high speed air blower and compressor system (to which the inventive coating material is applied) can be enhanced. Also, since a separate bearing-cooling system and a cooling air used therein are not necessary, the efficiency of the system may be enhanced by 10% or more. Furthermore, the inventive coating material can be applied to systems, which have a high-speed operation range in medium and high temperature environments, such as a gas turbine, a steam turbine, a turbo charger for use with a diesel automobile, etc. Particularly, it can improve a turbo lag in the turbo charger since it has less friction compared to existing oil bearings and can enhance the load-bearing and damping capabilities of the air foil bearing.

A coating material for a surface of an operating component of machinery may be provided. The coating material may comprise: 15 to 25 wt % antimony trioxide ($Sb_2O_3$); 50 to 70 wt % binder; 10 to 20 wt % tungsten disulphide ($WS_2$); and 5 to 15 wt % silver (Ag). Further, the coating material may comprise: 15 to 25 wt % antimony trioxide ($Sb_2O_3$); 40 to 65 wt % binder; 10 to 20 wt % tungsten disulphide ($WS_2$); 5 to 15 wt % silver (Ag); and 5 to 15 wt % molybdenum oxide ($MoO_3$). The binder may comprise 60 to 80 wt % nickel (Ni) and 20 to 40 wt % chromium (Cr). The binder may further comprise greater than 0 to 10 wt % aluminum (Al) based on the gross weight of the nickel and the chromium.

A coating method for a surface of an operating component of machinery may also be provided. According to the coating method, the above-described coating material may be pulverized. Further, a binder may be pulverized. The pulverized binder may be applied on the surface of the operating component to form a first layer. The pulverized coating material may be applied on the first coating layer of the binder to form a second layer. The second layer of the coating material may be grinded and polished. The first layer of the binder may be 30 to 50 μm thick and the second layer of the coating material may be 200 to 220 μm thick. Applying the pulverized binder and applying the pulverized coating material may be repeated at least twice, wherein each first layer of the binder may be 30 to 50 μm thick and each second layer of the coating material may be 30 to 50 μm thick. Applying the pulverized binder and applying the pulverized coating material may be performed by a plasma spray coating process. In the plasma spray coating process, a current may be 450 to 500 A, a voltage may be 40 to 80V, a standoff may be 90 to 110 mm, a primary reaction gas may be argon (Ar), a flow rate of the primary reaction gas may be 75 to 85 scfh, a secondary reaction gas may be hydrogen ($H_2$), a flow rate of the secondary reaction gas may be 7 to 13 scfh and a rate of feeding the pulverized binder and coating material may be 2.5 to 3 lbs/hr.

Any reference in this specification to "one embodiment," "an embodiment," "example embodiment," etc., means that a particular feature, structure or characteristic described in connection with the embodiment is included in at least one embodiment of the present invention. The appearances of such phrases in various places in the specification are not necessarily all referring to the same embodiment. Further, when a particular feature, structure or characteristic is described in connection with any embodiment, it is submitted that it is within the purview of one skilled in the art to effect such feature, structure or characteristic in connection with other ones of the embodiments.

Although embodiments have been described with reference to a number of illustrative embodiments thereof, it should be understood that various other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A coating material for a surface of an operating component of a machinery, comprising: 15 to 25 wt % antimony trioxide ($Sb_2O_3$); 50 to 70 wt % binder; 10 to 20 wt % tungsten disulphide ($WS_2$); and 5 to 15 wt % silver (Ag), wherein the binder comprises 60 to 80 wt % nickel (Ni) and 20 to 40 wt % chromium (Cr).

2. A coating material for a surface of an operating component of a machinery, comprising: 15 to 25 wt % antimony trioxide ($Sb_2O_3$); 40 to 65 wt % binder; 10 to 20 wt % tungsten disulphide ($WS_2$); 5 to 15 wt % silver (Ag); and 5 to 15 wt % molybdenum oxide ($MoO_3$), wherein the binder comprises 60 to 80 wt % nickel (Ni) and 20 to 40 wt % chromium (Cr).

3. The coating material of claim 1, wherein the binder further comprises greater than 0 to 10 wt % aluminum (Al) based on a gross weight of the nickel and the chromium.

4. The coating material of claim 2, wherein the binder further comprises greater than 0 to 10 wt % aluminum (Al) based on a gross weight of the nickel and the chromium.

* * * * *